United States Patent [19]

Parker

[11] Patent Number: 4,481,437

[45] Date of Patent: Nov. 6, 1984

[54] VARIABLE FLUX PERMANENT MAGNETS ELECTROMAGNETIC MACHINE

[75] Inventor: Rollin J. Parker, Greenville, Mich.

[73] Assignee: Hitachi Metals International Ltd., White Plains, N.Y.

[21] Appl. No.: 500,317

[22] Filed: Jun. 2, 1983

Related U.S. Application Data

[63] Continuation of Ser. No. 284,772, Jul. 20, 1981, abandoned.

[51] Int. Cl.³ .............................................. H02K 1/12
[52] U.S. Cl. .................................... 310/191; 310/154; 310/209
[58] Field of Search ................ 310/191, 209, 114, 190

[56] References Cited

U.S. PATENT DOCUMENTS

| | | | |
|---|---|---|---|
| 2,741,714 | 4/1956 | Regelman | 310/191 |
| 3,360,667 | 12/1967 | Gordon, Jr. | 310/191 X |
| 3,713,015 | 1/1973 | Frister | 310/114 X |
| 3,822,390 | 7/1974 | Janson | 310/190 X |
| 4,110,549 | 8/1978 | Mas | 310/191 |

Primary Examiner—Donovan F. Duggan
Attorney, Agent, or Firm—Hauke and Patalidis

[57] ABSTRACT

The rotor or stator of an electro-magnetic machine, such as an electric motor, having permanent magnets is provided with auxiliary permanent magnets which are relatively positionable to provide an external magnetic flux path during normal operation of the machine and an internal magnetic flux path to enable the rotor to be readily separated from the stator for the purpose of maintenance or repair work. The invention also contemplates, for example, fine speed calibration, through variation of the intensity of a magnetic field during running of electro-magnetic machines such as DC motors.

11 Claims, 11 Drawing Figures

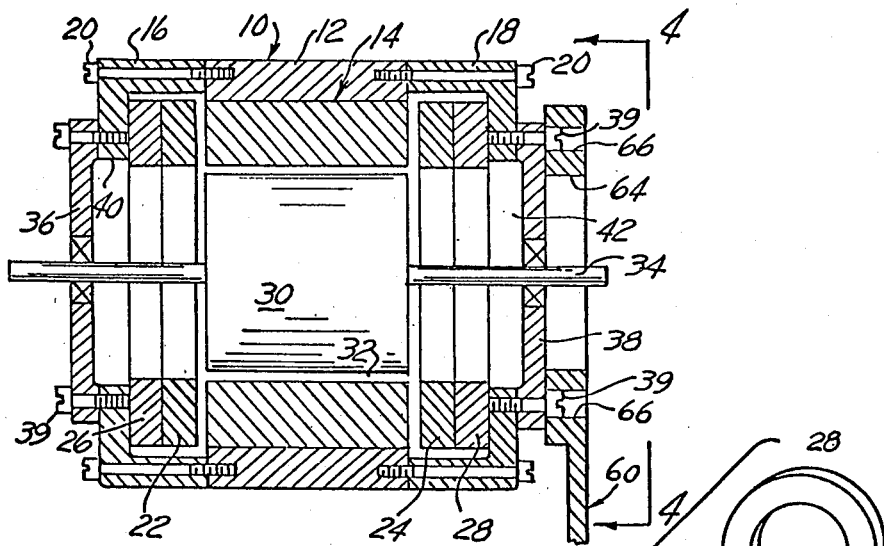
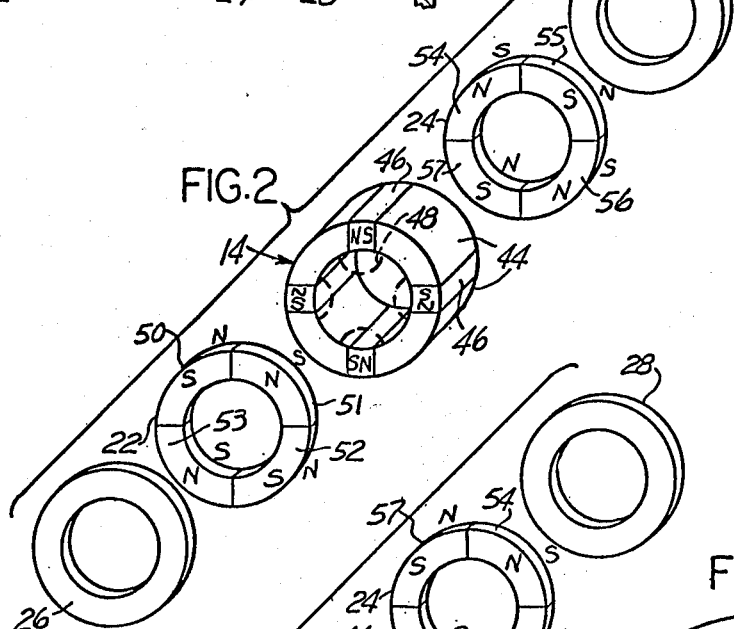
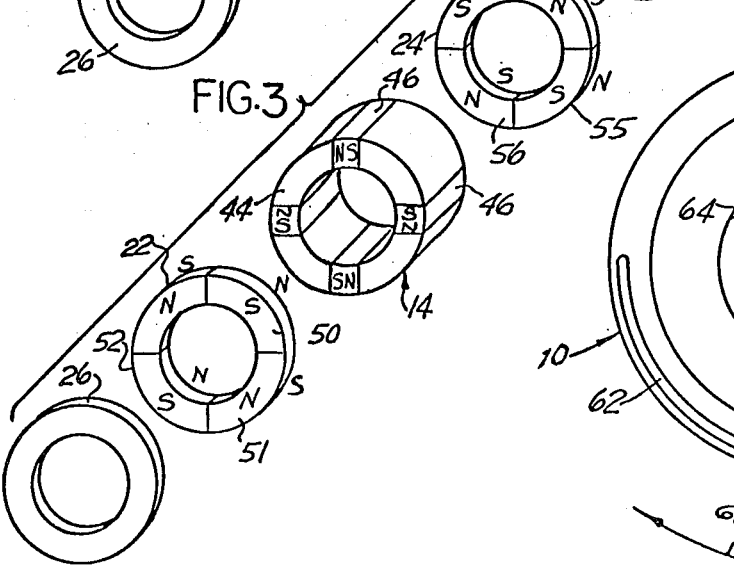
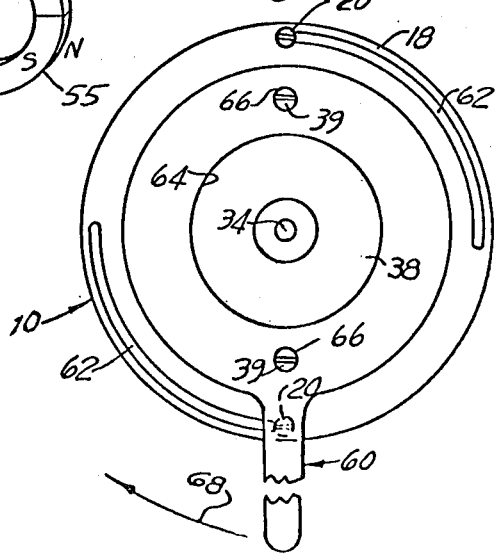

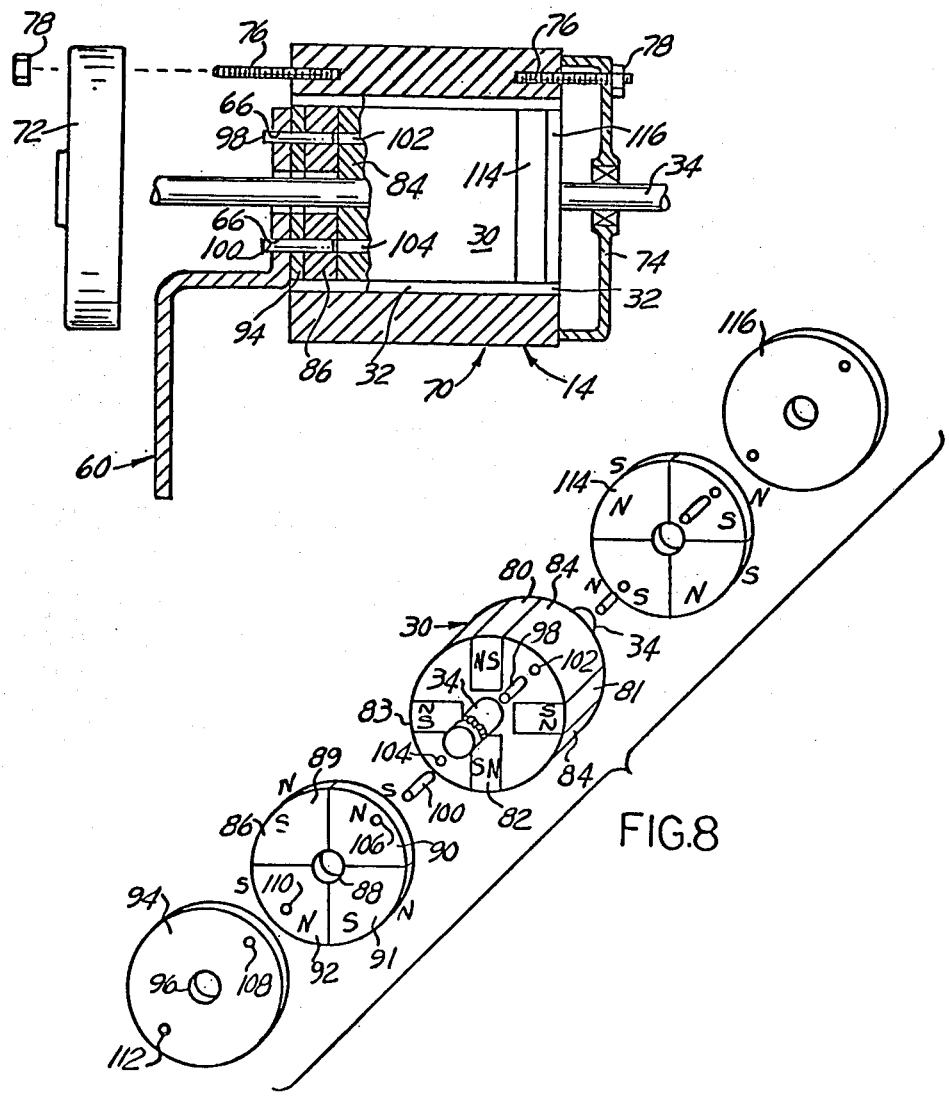

FIG. 9
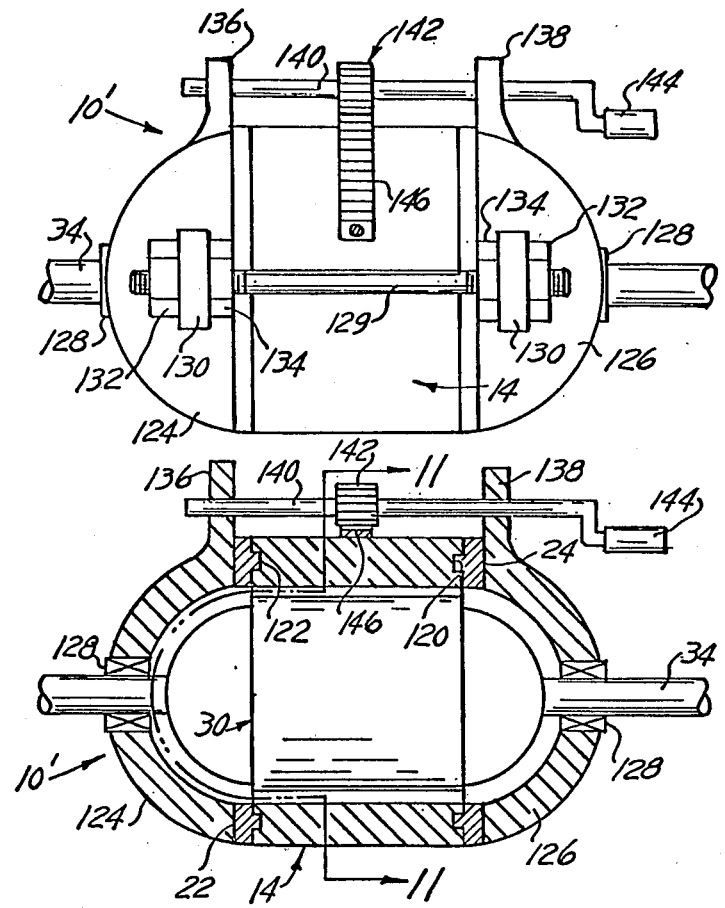
FIG. 10
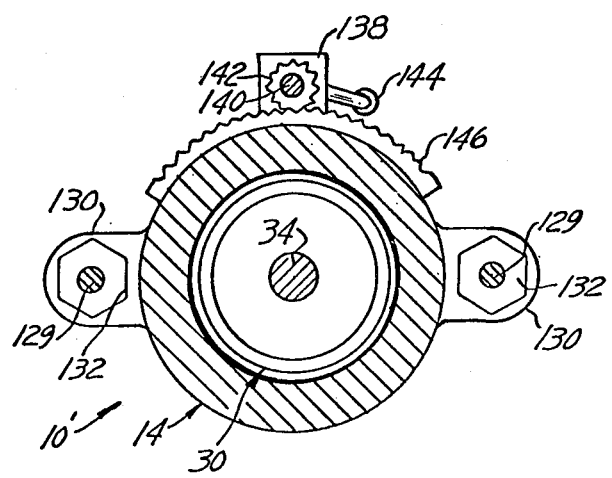
FIG. 11

© 2024

VARIABLE FLUX PERMANENT MAGNETS ELECTROMAGNETIC MACHINE

This is a continuation, of application Ser. No. 284,772, filed July 20, 1981, now abandoned.

BACKGROUND OF THE INVENTION

The development of rare earth-cobalt permanent magnets during the decade of the 1970s has enabled marked improvements to take place in such diverse products as electric motors for miniature alarm clocks, stepping motors, a wide variety of switches such as microswitches, lock-in switches, temperature-actuated switches, reed relays, resonant relays, as well as headphones, magnetic bearings, magnetic clamp systems, etc.

The very compact high field density structure provided by these magnets makes them attractive for use in industrial motors. Where alnico magnets have been used in machines of more than about 1 KVA rating which utilize permanent magnets in either the rotor or the stator, or in both, it has been found necessary to supply auxiliary windings on the alnico poles for the calibration of the speed and also for use with a special pulse demagnetizer and remagnetizer for use in case of, for example, bearing failure necessitating the removal of the armature or rotor from the machine. In such machines the need for both permanent magnet and electromagnetic excitation systems imposes a cost penalty.

The present invention is aimed at providing a motor in which the permanent magnetic flux path through the stator, rotor or both may be momentarily internally shunted so as to prevent it from passing to the rotor of the machine. The rotor can then be separated from the stator and housing for maintenance or repair without magnetic hindrance.

SUMMARY OF THE INVENTION

The invention is directed to electromagnetic machines such as synchronous and direct current motors utilizing permanent magnets in either or in both the rotor and stator. The rotor or stator, or both have centrally positioned permanent magnets which provide a direct magnetic flux path between the stator and rotor of the machines and end-positioned permanent magnets which provide an indirect magnetic flux path between the stator and rotor of the machines. The invention provides end-positioned magnets which can be manually rotated with respect to the centrally positioned magnets between an external-flux position, where the two flux paths are additive, and an internal-flux position, where the flux paths are subtractive or internal and there is no flux path between the rotor and stator of the machines. Settings between these two extreme position permit other control functions to be effected, as speed regulation or calibration, for example.

The diverse objects and advantages of the present invention will become apparent to those skilled in the art when the following description of the best modes contemplated for practicing the invention is read in conjunction with the accompanying drawings wherein:

BRIEF DESCRIPTION OF THE DRAWINGS

FIG. 1 is a schematic sectional view of an electric motor in accordance with the invention;

FIG. 2 is an exploded schematic perspective view of an example of a four-pole stator usable in the electric motor of FIG. 1;

FIG. 3 is a view similar to FIG. 2, useful in explaining the principle of the present invention;

FIG. 4 is an end view of the motor of FIG. 1 as seen from line 4—4 of FIG. 1;

FIGS. 5-6 are views similar to FIG. 4, but showing a modification thereof for rotating the end magnets of a motor rotor;

FIG. 7 is a partially exploded schematic sectional view of the electric motor of FIGS. 5-6 as seen from line 7—7 of FIG. 5;

FIG. 8 is an exploded schematic perspective view of a four-pole rotor assembly for the electric motor of FIGS. 5-7;

FIG. 9 is a schematic elevational view of a variable speed electric motor according to the present invention;

FIG. 10 is a longitudinal sectional view thereof; and

FIG. 11 is a cross-sectional view thereof taken along line 11—11 of FIG. 10.

DETAILED DESCRIPTION OF THE PREFERRED EMBODIMENTS

Referring to the drawings, and more particularly to FIG. 1, an electric motor 10 according to the invention comprises a cylindrical housing 12 in which is mounted, by any appropriate convenient means, a cylindrical tubular stator 14 comprising high strength permanent magnets such as ceramic, or ceramic rare earth, cobalt-rare earth, or the like magents. Each one of a pair of end cap members 16 and 18 fastened at an end of the housing 12 by bolts or screws 20 supports respectively an end magnet ring 22 an end magnet ring 24, each through the intermediary of one of a pair of soft iron rings 26 and 28, by means of any appropriate convenient fastening means, not shown. The stator 14 is tubular, and a rotor 30 is disposed concentrically for rotation within the stator 14, a radial air gap 32 being formed between the peripheral surface of the rotor 30 and the internal surface of the stator 14. The rotor 30 is supported by a rotatable shaft 34 journalled through end plates 36 and 38. The end plate 36 is mounted, by means of bolts or screws 39 over a circular opening 40 at the center of the end cap 16, and the end plate 38 is similarly fastened over a central opening 42 in the end cap 18. The openings 40 and 42 are of a diameter clearing the periphery of the rotor 30, so as to enable original assembly of the rotor 30 within the stator 14, and so as to permit removal of the rotor after removing the end plates 36 and 38. It is evident that the magnet rings 22 and 24 and the soft iron rings 26 and 28 also have an internal diameter permitting passage therethrough of the rotor 30 during original assembly of the electric motor 10, and in the course of dismantling the motor 10.

The rotor 30 is in the form of, for example, an armature of laminated steel plates provided with appropriate windings, not shown, connected in the usual manner to appropriate commutation means or to a collector ring, according to whether the motor is a DC or AC motor. The windings and other electrical elements are not shown as they form no part of the present invention.

The use of strong ceramic, ceramic-rare earth or cobalt-rare earth permanent magnets in the stator 14 and in the end magnet rings 22 and 24 permits to establish strong magnetic fields through the air gap 32, resulting in a very efficient electro-dynamic machine of a much smaller size for a given power. For example, and as illustrated schematically in the exploded view of FIG. 2, the stator 14 may be made of four laminated pole pieces 44 and four rectangular permanent magnets 46. The polarity of the magnets 46 is, for example, as indicated, and the magnets create in the space within the annular stator 14 a strong magnetic field as indicated in dashed lines at 48, with strong line of forces of the magnetic field penetrating through the stator or armature, not shown at FIG. 2, normally disposed within the tubular stator 14. The magnetic field is further reinforced to high air gap flux density, as limited only by the saturation of the laminated pole pieces 44, by the end magnet rings 22 and 24 each made of four annular segment permanent magnets 50, 51, 52 and 53 (ring 22), and 54, 55, 56 and 57 (ring 24), the polarity of the ring magnets being oriented as indicated in the drawing, for the orientation of the bar magnets 46 in the stator 14 being as indicated in the drawing.

When the four-pole end rings 22 and 24 are rotated by 90° around their axis relative to the four-pole stator 14, from the position schematically illustrated at FIG. 2 to the position illustrated at FIG. 3, the magnetic fields generated by the magnet rings 22 and 24, as a result of presenting the polarity illustrated, is substracted from the magnetic fields provided by the rotor 14. Consequently, with substantially equal magnetic fluxes, there is no significant magnetic field applied through the air gap 32 to the rotor 30, FIG. 1, and the rotor may, without difficulty, be removed from the housing 12 for repair or maintenance of the electro-dynamic machine 10.

A spanner 60, as shown at FIGS. 1 and 4, is for example used for manually rotating the end caps 18 and 16 after loosening the bolts or screws 20 holding the end caps attached to the end of the housing 12. The mounting apertures through which the bolts or screws 20 are passed through the wall of the end caps 16 and 18 are each in the form of an arcuate slot 62 extending over an arc of slightly more than 90°. The spanner 60 is provided with a central opening 64 for clearing the shaft 34, and a pair of diametrically opposed apertures 66 engageable over the heads of the bolts or screws 39 fastening the end plates 36 and 38 over the openings 40 and 42, FIG. 1, in the end caps 16 and 18, respectively. In this manner, by rotating the spanner 60 in the direction of the arrow 68, the end caps 16 and 18 may be individually rotated 90° away from their original position, thus in turn rotating the annular magnet rings 22 and 24 from the position schematically illustrated at FIG. 2 to the position schematically illustrated at FIG. 3, such as to cause the magnetic field to be shunted internally to the stator 14, FIGS. 1-3.

The invention also has applications in electro-magnetic macines, such as DC motors or AC synchronous motors, provided with high strength permanent magnets in the rotor, an example of which is illustrated at FIGS. 5-7. As shown in the sectional view of FIG. 7, an electric motor 70 has a cylindrical tubular stator 14, which may be made integral with the motor housing or disposed therein, and in which are disposed appropriate windings, not shown. A cylindrical rotor 30, provided with permanent magnets, creates a strong magnetic field across the radial air gap 32. The rotor 30 is supported by a shaft 34 journalled by means of appropriate bearings in the end caps 72 and 74, the end caps 72 and 74 being normally mounted each at one end of the stator 14 by way of studs 76, projecting through appropriate mounting apertures in the end caps, and by nuts 78, for example.

The rotor 30, FIG. 8, has a main portion keyed on the shaft 34 and comprising four rectangular permanent magnets 80, 81, 82 and 83, for a four-pole machine, with their magnetic polarity as indicated, which are disposed at 90° from each other between soft iron laminated sectors 84. A magnet disk 86 is mounted on one end of the rotor 30. The magnet disk 86 has a central aperture 88 clearing the shaft 34, and is made of four permanent magnet sectors 89, 90, 91 and 92 with their polarity oriented as shown. A soft iron disk 94, having a central aperture 96 clearing the shaft 34, is mounted on the outside of the magnet disk 86. Any convenient means such as, for example, screws or pins 98 and 100 fitted respectively in longitudinal bores 102 and 104 in diametrically opposed soft iron segments 84 of the rotor 30 and projecting through aligned apertures 106 in the magnet disk 86 and 108 in the soft iron disk 94 and through aligned apertures 110 and 112, respectively in the magnet disk 86 and in the soft iron disk 94, provide correct orientation of the magnets 89-92 in the magnet disk 86 relative to the magnets 80-83 in the rotor 30, and assembly of the rotor 30 with the magnet disk 86 and the soft iron disk 94. A second magnet disk 114, provided with a soft iron disk 116, is mounted in the same manner on the other side of the rotor 30.

With the magnets of the rotor 30 and the magnets of the end disks 86 and 114 oriented as illustrated at FIG. 8, the magnetic fields are additive and thus create a strong radial field across the gap 32, FIG. 7, while, after rotating the magnet disks 86 and 114 90° around the shaft 34, the magnetic fields are subtractive and internal to the rotor 30, such that the rotor 30 may be easily removed from within the stator 14. As shown at FIGS. 5-7, a spanner 60 may be used for rotating the rotor end magnet disks 86 and 114. For rotating the rotor end magnet disk 86, the screws or pins 98 and 100 are pulled from the longitudinal bores 102 and 104 in the rotor 30 sufficiently so as to clear the edge of the bores, and the spanner 60 is used, with the pins or bolts 98 and 100 engaged in the apertures 66 of the spanner for applying a torque to the iron disk 94 and the magnet disk 86 for rotating the magnet disk 86 90° relative to the orientation of the rotor 30. If so desired, longitudinal bores may be provided in the rotor 30, 90° from the bores 102 and 104, to ensure appropriate location of the magnet disk 86, and temporary reassembly with the rotor 30 during removal of the rotor 30 from within the stator 14. The same operation is effected on the other end magnet disk 114, by using the spanner 60 for rotating the end magnet disk 114 90° away from its original functional position.

The invention further provides for adjustably varying the magnetic field flux of permanent magnets used in the rotor or preferably in the stator of an electro-magnetic dynamic machine, for calibrating or adjusting the speed of an electric motor output shaft. The main magnets are provided with end magnets, and the polarity of the magnets is such that the magnetic fluxes are normally additive. By adjustably varying the additive factor of the magnets by relative rotation of the main magnets and end magnets the resulting effective flux may thus be calibrated from a maximum to any appropriate value.

An example of structure for achieving such results is illustrated schematically at FIGS. 9-11. A DC electric motor 10' is provided with a stator 14 which may have a structure as illustrated at FIG. 2. The stator 14 has end magnet rings 22 and 24, an arrangement such as the illustrated annular groove 120 at each end face of the stator 14 and a corresponding projecting annular portion 122 in the corresponding face of the magnet rings 22 and 24 providing axial alignment between the stator and the rings and preventing radial displacement therebetween. End caps 124 and 126 form return paths for the magnetic flux and are provided with appropriate bearings 128 through each of which is journalled an end of the shaft 34 supporting the rotor 30 in the form of a laminated armature provided with adequate windings, not shown. The stator 14 and the end caps 124 and 126 are held in assembly and in alignment by means of, for example, a pair of laterally disposed tie rods 129 passed through aligned apertures in projecting lugs 130 attached to or made integral with each of the end caps 124 and 126. The tie rods 129 are each threaded at both ends, a pair of nuts 132 and 134 interconnecting each tie rod 129 to the corresponding lug 130 of the end caps 124 and 126. The magnet rings 22 and 24 are affixed to their corresponding end cap 124 and 126 by appropriate means, not shown, the end cap 124 being provided with a pillow block 136, and the end cap 126 being provided with a pillow block 138 supporting a rotatable shaft 140 on which is keyed a pinion or gear 142. The shaft 140 may be manually rotated by a crank 144 so as to rotate the gear 142 meshing with an arcuate rack 146 affixed around about 90° of the periphery of the stator 14, for a four-pole machine. After loosening slightly one of the nuts 132 of each tie rod 129 to remove tension from the tie rods the main stator 14 may be adjustably rotated relative to the end caps 124 and 126 and, consequently, relative to the end magnet rings 22 and 24 by rotating the gear 142 by means of the crank 144. After correct calibration, such as speed calibration for example, is achieved, the tie rods 129 may be tensioned again by tightening the fastening nuts 132. Exact calibration of the speed of DC electric motors, for example, presents many advantages in installations such as, for example, steel mill runout tables where a plurality of consecutive rollers are operated at precise speed differentials for steel strip thickness reduction.

It will be further appreciated by those skilled in the art that a structure such as that illustrated at FIGS. 9-11, in addition to permitting precise magnetic flux calibration on the run, so to speak, also permits to position the magnets of the main rotor portion 14 relative to the magnets of the end magnet rings, such as to eliminate or considerably reduce the magnetic field passing through the rotor 30, prior to dismantling the motor 10' for maintenance or repair.

Having thus described the present invention by way of typical practical applications thereof, given for illustrative purpose only, modifications whereof will be apparent to those skilled in the art, what is claimed as new is as follows:

1. A rotating electro-magnetic machine comprising concentric stationary and rotating members, at least one first pair of permanent magnets disposed in one of said members for creating a first magnetic flux having a path external to said one of said members through a radial air gap into the other of said members, at least a second pair of permanent magnets disposed on one side of said first pair substantially linearly aligned with said first pair and angularly oriented relative to said first pair such as to create a second magnetic flux in addition to said first magnetic flux, at least a third pair of permanent magnets symmetrically disposed on the other side of said first pair substantially linearly aligned with said second pair and angularly oriented relative to said first and second pairs such as to create a third magnetic flux in addition to said first and second magnetic fluxes, and means for controllably angularly orienting said second and third pairs of magnets relative to said first pair for varying the strength of said first magnetic flux having said external path, wherein each of the magnets of said first pair are bar magnets having transversely aligned opposite polarities, and each of the magnets of said second and third pairs are ring magnets having longitudinally aligned opposite polarities.

2. The machine of claim 1 wherein said means of controllably angularly orienting said second and third pairs of magnets relative to said first pair is adapted to transform said magnetic flux having a path external to said one of said members to a magnetic flux having a path internal to said one of said members.

3. The machine of claim 1 wherein said second and third magnetic fluxes created by said second and third pairs of magnets are substantially equal and said first magnetic flux created by said first pair of magnets is substantially equal to the sum of said second and third magnetic fluxes.

4. The machine of claim 2 wherein said second and third magnetic fluxes created by said second and third pairs of magnets are substantially equal and said first magnetic flux created by said first pair of magnets is substantially equal to the sum of said second and third magnetic fluxes.

5. The machine of claim 1 wherein said stationary member is a tubular stator and said rotating member is a rotor mounted in a shaft concentric to said stator.

6. The machine of claim 1 wherein said second and third pairs of magnets are made of magnetic material selected from the group consisting of ceramic and cobalt-rare earth magnetic materials.

7. The machine of claim 5 wherein said first, second and third pairs of permanent magnets form said stator, said second and third pairs of magnets being each in the form of a ring adjustably rotatable at an end of said stator.

8. The machine of claim 5 wherein said first, second and third pairs of magnets form said rotor, and said second and third pairs of magnets are each in the form of a disk having an opening for passage therethrough of said shaft, each said disk being rotatably and adjustably mounted at an end of said rotor.

9. The machine of claim 7 wherein said means for controllably angularly orienting said second and third pairs of magnets relative to said first pair is a spanner engageable with said ring.

10. The machine of claim 8 wherein said means for controllably angularly orienting said second and third pairs of magnets relative to said first pair is a spanner engageable with said disk.

11. The machine of claim 7 wherein said means for controllably angularly orienting said second and third pairs of magnets relative to said first pair is a rack and pinion mechanism enabling angular rotation of said first pair of magnets relative to said second and third pairs for speed calibration of said machine.

* * * * *

UNITED STATES PATENT AND TRADEMARK OFFICE
CERTIFICATE OF CORRECTION

PATENT NO. : 4,481,437
DATED : November 6, 1984
INVENTOR(S) : Rollin James Parker It is certified that error appears in the above-identified patent and that said Letters Patent are hereby corrected as shown below:

Col. 2, line 31, correct the spelling of "magnets".

Col. 3, line 53, correct the spelling of "machines".

Signed and Sealed this

Twenty-sixth Day of March 1985

[SEAL]

*Attest:*

DONALD J. QUIGG

*Attesting Officer*   *Acting Commissioner of Patents and Trademarks*